United States Patent [19]

Reimann

[11] Patent Number: 4,695,971
[45] Date of Patent: Sep. 22, 1987

[54] CIRCUIT FOR RAPIDLY DETERMINING THE GREATEST DIFFERENCE AMONG THREE BINARY NUMERICAL VALUES

[75] Inventor: Udo Reimann, Munich, Fed. Rep. of Germany

[73] Assignee: Siemens Aktiengesellschaft, Berlin and Munich, Fed. Rep. of Germany

[21] Appl. No.: 676,673

[22] Filed: Nov. 30, 1984

[30] Foreign Application Priority Data

Nov. 30, 1983 [DE] Fed. Rep. of Germany ....... 3343404

[51] Int. Cl.⁴ .......................... G05F 7/50; G05B 1/00
[52] U.S. Cl. .................................... 364/769; 340/146.2
[58] Field of Search ... 364/768, 769, 784, 900 MS File; 340/146.2

[56] References Cited

U.S. PATENT DOCUMENTS

| 3,196,262 | 7/1965 | Thompson | 364/769 |
| 3,376,408 | 4/1968 | Cogar | 364/769 |
| 3,434,109 | 3/1969 | Coote | 364/769 |
| 4,200,886 | 4/1980 | Musmann et al. | 358/135 |
| 4,386,366 | 3/1983 | Mori | 358/135 |
| 4,410,960 | 10/1983 | Kasuya | 340/146.2 |
| 4,450,432 | 5/1984 | Schmidtpott et al. | 340/146.2 |

OTHER PUBLICATIONS

"A Comparison of Extended Differential Coding Schemes for Video Signals," Musmann, Proceedings of the International Zurich Seminar on Digital Communications, Mar. 12–15, 1974, pp. C1(1)–C1(7).

"Test System for Digital TV Transmission," Klutz et al., Electrical Communication, vol. 51, No. 2, 1976, pp. 100–105.

Primary Examiner—Archie E. Williams, Jr.
Assistant Examiner—Long T. Nguyen
Attorney, Agent, or Firm—Hill, Van Santen, Steadman & Simpson

[57] ABSTRACT

A circuit for rapidly determining the greatest difference among three binarily represented numerical values also undertakes a classification and coding of the maximum difference within a number of different numerical ranges wherein only the most significant bits of the differences following the operational sign bit are required for such classification. A two-stage logic circuit is used for the classification and coding to which the most significant bits are supplied. The circuit is particularly useful in two-dimensional DPCM coding wherein a switchable quantizer and a quantizer controller are utilized to control the contrast of adjacent picture elements including an overall video display.

6 Claims, 4 Drawing Figures

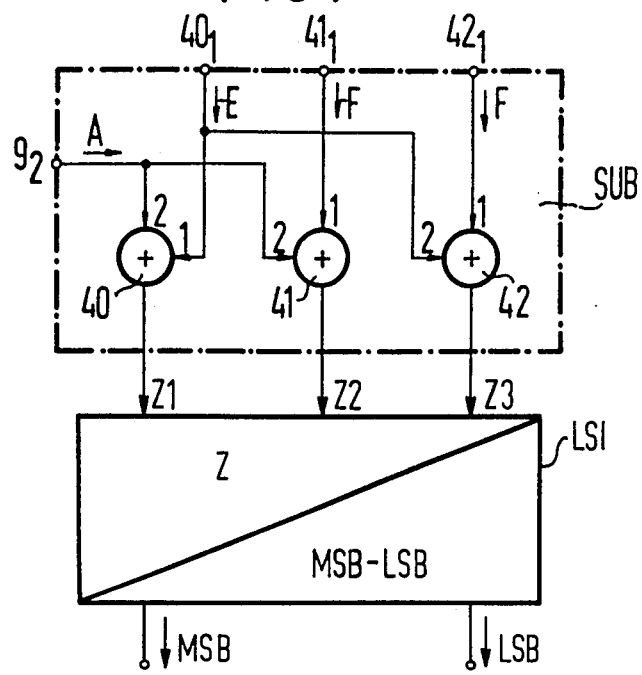

FIG 4

| +V | | | | | | -V | | | | | |
|---|---|---|---|---|---|---|---|---|---|---|---|
| $K_8 \cong a$ | 1 | 0 | 0 | 0 | 0 | $K_8 \cong a$ | 0 | 1 | 1 | 1 | 1 |
| $K_7 \cong b$ | X | 1 | 1 | 0 | 0 | $K_7 \cong b$ | X | 0 | 0 | 1 | 1 |
| $K_6 \cong c$ | X | 1 | 0 | 1 | 0 | $K_6 \cong c$ | X | 0 | 1 | 0 | 1 |
| $\overline{MSB} \cong \overline{a \vee b}$ | 0 | 0 | 0 | 1 | 1 | $\overline{MSB} \cong \overline{a \wedge b}$ | 0 | 0 | 0 | 1 | 1 |
| $\overline{LSB} \cong \overline{a \vee c}$ | 0 | 0 | 1 | 0 | 1 | $\overline{LSB} \cong \overline{a \wedge c}$ | 0 | 0 | 1 | 0 | 1 |
| MD | | ≥96 | ≥64 | ≥32 | <32 | MD | | ≥|96| | ≥|64| | ≥|32| | <|32| |

CIRCUIT FOR RAPIDLY DETERMINING THE GREATEST DIFFERENCE AMONG THREE BINARY NUMERICAL VALUES

BACKGROUND OF THE INVENTION

1. Field of the Invention

The present invention relates to a circuit for rapidly determining the largest difference among three binary numerical values and for allocating the maximum difference to one of a plurality of numerical ranges and for generating a control signal corresponding to that range. Circuits for accomplishing these results are particularly useful in two-dimensional differential pulse code modulation (DPCM) coding wherein a switchable quantizer and a quantizer controller are utilized to which the most recently calculated numerical value representing a picture element or pixel signal value as well as picture element signal values adjacent to the most recently calculated value are supplied via registers, and a comparison device and an extreme value control are provided for determining the greatest and smallest value of the adjacent picture element signal values. A subtraction means for forming the differences is utilized. Such a DPCM system is described for example, in the co-pending application of Alexander Starck, filed Aug. 19, 1984 and assigned U.S. Ser. No. 641,727, corresponding to German application No. P3331426.8, and assigned to the assignee of the present application.

A problem in the use of such devices is that the greatest difference between a plurality of numerical values must be determined when processing the data, particularly when coding television signals. In DPCM coding of television signals, a quantizer is controlled dependent upon the contrast of a picture element to be coded with respect to the picture elements surrounding the element to be coded. If only slight contrast between the element to be coded and the surrounding elements exists, such contrast generally referred to as "activity" in controlled DPCM coding, the coding then takes place in small steps, whereas larger quantizing steps are employed given greater activity. An improvement in the picture quality is thereby achieved. This procedure is explained in greater detail in the aforementioned patent application Ser. No. 641,727. Processing of the last picture element signal preceeding the picture element to be coded is critical with respect to time. All other picture element signals will already have been available to the coder or the decoder at the receiver for a longer time. As a result, preprocessing of those signals can already be undertaken, so that an arithmetic operation in which the last picture element signal value, referred to herein as value A, still must be undertaken.

This arithmetic operation takes the form of determining the differences between the signal value A and the two extrema, referred to herein as E and F, of the previously processed signal values. The maximum differences determined by the operational signs of these differences and is forwarded to other processing circuitry via multiplexers. Although conventional difference selecting circuits for determining the maximum difference generally contain only a few gate circuits, such gate circuits cause transit times which are unacceptably high given the higher processing speeds of which the remainder of the processing circuitry is capable.

After determining the greatest difference, this value is supplied to a threshold logic circuit which classifies the difference in one of several numerical ranges, and emits a control signal depending upon the classification. An additional transit time delay results from this circuit as well.

SUMMARY OF THE INVENTION

It is an object of the present invention to provide a circuit for rapidly determining the greatest difference among three binarily represented numerical values, for classifying the maximum difference, and for coding a control signal in accordance with the classification in a manner which does not add significant transit time delay to the overall processing.

The above objects are inventively achieved in a circuit wherein, after the maximum difference has been determined, only a selected number of bits which are most significant following the operational sign bit of the maximum difference are supplied to the inputs of a two-stage logic circuit for classifying the maximum difference and encoding that difference. A sub-logic circuit within the logic circuit is provided for each control bit of the control signal which is to be generated, the first logic stage thereof being comprised of NOR/OR gates and AND/NAND gates which execute a discrete coding for positive and negative differences in parallel. The operational sign bits are supplied to all gates of the first logic stages of the logic circuit for selecting the control signal corresponding to the largest difference. The respective outputs of all of the gates of the first stage of one of the sub-logic circuits are respectively combined with the inputs of an OR circuit, at whose output one control bit is emitted. The circuit arrangement disclosed and claimed herein achieves extremely short transit times for completing the necessary operations. The differences of the binary numerical values are supplied to the two-stage logic circuit. Coding of the control bits of the control signal takes place in the first logic stage. Selection of the bits of the maximum difference and selection of the control bits simultaneously takes place by means of the operational sign bits, which are likewise supplied to the gates of the first logic stage. This produces a minimum transit time. The operational sign bits, of course, must be supplied inverted to some of the gate circuits of the first logic stage in order to select the bit combinations of the maximum difference from the three differences formed. The circuit arrangement disclosed and claimed herein can preferably be executed in conventional integrated circuit technology.

In a preferred embodiment of the invention, only the operational sign bit and the three following, most significant amount bits of each difference are supplied to the following logic circuit. Consideration of the three most significant bits is sufficient for most decisions. The circuit outlay is considerably reduced as a result. A division into a maximum of two sets of eight numerical ranges is possible on the basis of the three most significant bits.

It is preferable in many cases that the set of numerical values of the differences is divided or classified into numerical ranges having respective limits which are formed by a power of two with whole components corresponding to the place value of the least significant bit employed for defining the numerical ranges, or are formed by a whole multiple of this power, and that four such numerical ranges are provided, these being defined by the two less significant bits employed, with larger differences being assigned to the largest of these numerical ranges. Although specific numbers will have more meaning in the detailed discussion which follows, by way of example if the least significant bit employed for the definition of the numerical ranges happens to be the fifth most significant bit of the binary number representing the difference, the ranges into which the differences are classified may be defined by increments of 32 ($2^5$), and if 4 such ranges are selected, the differences may be classified as those whose selected number of significant bits fall within the respective ranges of less than 32, greater than or equal to 32 but less than 64, greater than or equal to 64 but less than 96, and greater than 96. Any larger differences would automatically be classified in the "greater than 96" range.

In many cases, the most significant bit functions only as a carry bit. The actual magnitude of the binary number lies in the following less significant bits. In such situations, it is preferable to also employ these bits for the range division.

In one embodiment, the two sub-logic units may each include three NOR gates and three AND gates, the outputs thereof being respectively connected to the inputs of another NOR gate. The two most significant bits of the three differences formed in the subtraction unit are supplied to one NOR gate and one AND gate of the first sub-logic unit. The most significant bit and the least significant bit are respectively supplied to a NOR gate and an AND gate of the second sub-logic unit. The operational side bits of the differences are supplied to all further inputs of all of the gates of the two logic sub-stages for utilization in determining the control signal corresponding to the greatest difference.

The logic circuit undertakes a standard range division and can be realized with relatively little circuit outlay and low transit times. It is possible, of course, for NOR and AND gates to be replaced by OR and NAND gates. The OR circuit having inputs connected to the outputs of the gates of the first logic stage would then be replaced by an AND circuit.

DESCRIPTION OF THE DRAWINGS

FIG. 1 is a schematic block circuit diagram of a circuit constructed in accordance with the principles of the present invention.

FIG. 2 is an operational sign table for explaining the circuit shown in FIG. 1.

FIG. 4 is a coding table for the logic circuit shown in FIG. 3.

DESCRIPTION OF THE PREFERRED EMBODIMENTS

Figure 3:
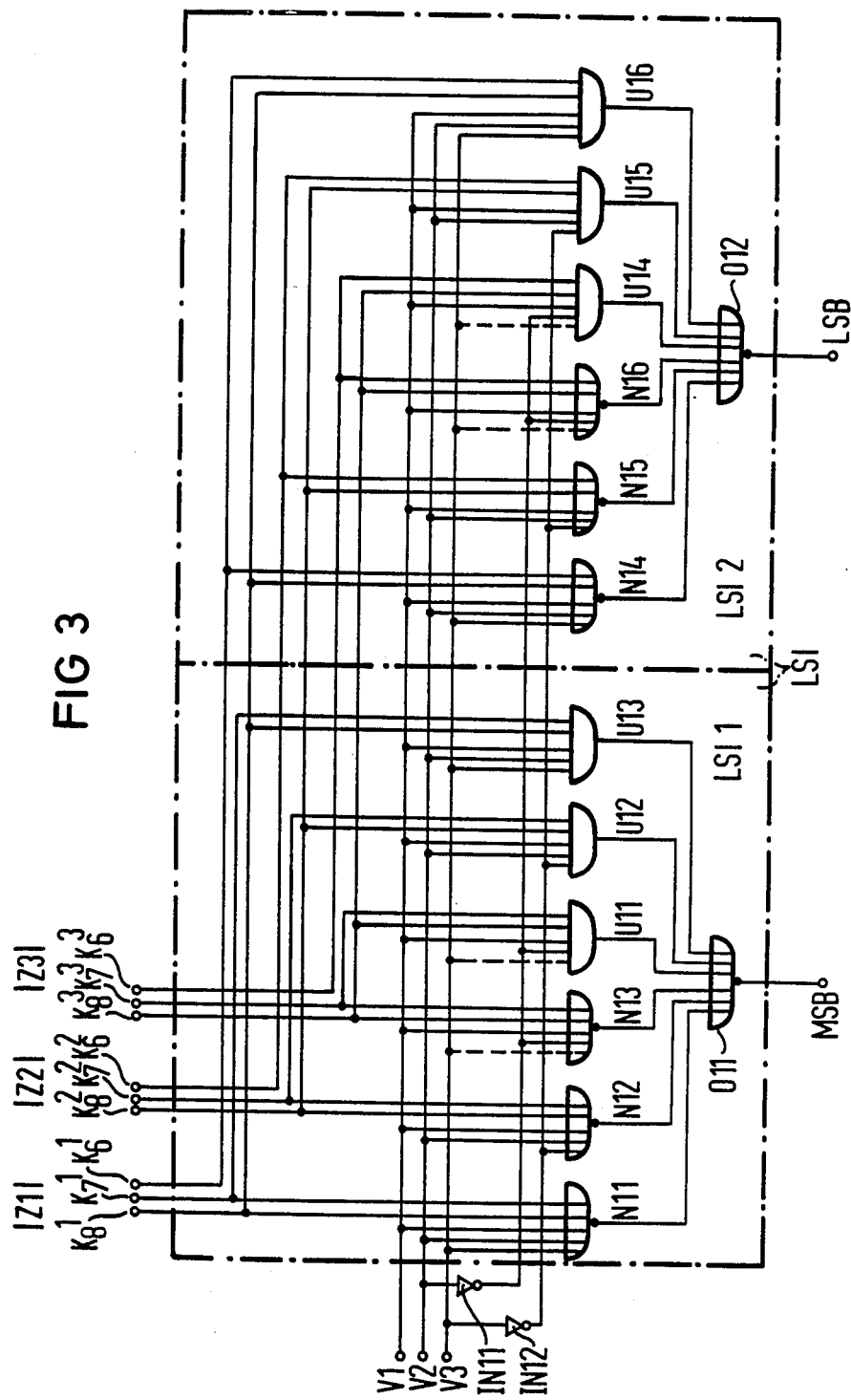
FIG. 3 is an embodiment of a logic circuit for use in the system shown in FIG. 1.

A block circuit diagram for a circuit for rapidly determining the greatest difference among three binary numerical values constructed in accordance with the principles of the present invention is shown in FIG. 1. The circuit contains a subtraction unit SUB and a logic circuit LSI. The subtraction unit SUB contains three adders 40, 41 and 42. The current numerical value A, which is the last value available for further processing is supplied to the second input 2 of the first adder 40, and to the second input 2 of the second adder 41, being supplied to those inputs through an input $9_2$ of the subtraction unit SUB. A second, inverted numerical value $-E$ is supplied to the first input 1 of the first adder 40, and to the second input 2 of the third adder 42, being supplied thereto through a second input $40_1$ of the subtraction unit SUB. The third inverted numerical value $-F$ is supplied to the first input of the second adder 41 through a third input $41_1$ of the subtraction unit SUB. The same, non-inverted numerical value F is supplied via a fourth input $42_1$ of the subtraction unit SUB to the first input 1 of the third adder 42. The outputs of the adders are connected to the logic circuit LSI. It will be understood by those skilled in the art that instead of the inverted numerical values, for example, the two's compliment could be utilized for a more precise calculation of the exact differences.

The three differences $Z1=A-E$, $Z2=A-F$ and $Z3=F-E$ among the three numerical values A, E and F are formed in the subtraction unit SUB. A control signal encompassing two bits is encoded by the logic circuit, the control signal being dependent on the size of the amount of the largest difference. The two-bit control signal MSB-LSB of the largest difference is through-connected by the logic circuit LSI in a manner described in greater detail below, the two bits of the control signal being referenced MSB and LSB.

As already mentioned, determination of the maximum difference is undertaken by evaluation of the operational signs of the differences formed by the subtraction unit SUB. An operational sign table for this purpose is shown in FIG. 2. Only six of the eight illustrated operational sign combinations are actually possible. The maximum amount difference MD is determined from the operational sign combinations. The operational sign V(MD) of the maximum difference MD is also indicated.

The manner by which the maximum difference MD can be determined on the basis of the operational signs V of the differences shall be demonstrated with reference to the operational sign table of FIG. 2. A positive operational sign is generally represented in binary notation as a logical zero, and a negative operational sign as a logical one. The operational sign is assumed to be positive given a difference of zero. This evaluation shall be explained in greater detail with reference, for example, to the last two columns of the table of FIG. 2.

It can be derived from the next-to-last column of FIG. 2 that A is less than E, A is also less than F, and F is greater than or equal to E. Therefore, the greatest amount difference is $A-F$.

Similarly, it may derived from the last column of FIG. 2 that E is greater than A, F is greater than A, and E is greater than F. The greatest amount difference MD is therefore $A-E$.

It is self evident that other differences may also be formed, for example, $E-A$, $A-F$ and $E-F$, instead of $A-E$, $A-F$ and $F-E$, The logic circuit LSI shown in FIG. 3 contains a first logic sub-circuit LSI1 and a second logic sub-circuit LSI2. The first logic stage of the first sub-circuit LSI1 contains NOR gates N11, N12 and N13, as well as AND gates U11, U12 and U13. The outputs of these gates are connected to the inputs of an inverting OR circuit O11. The three most significant bits of the three differences Z1, Z2 and Z3 are referenced $K_8$, $K_7$ and $K_6$. The association to one of the differences is indicated by means of a superscript. Thus the two most significant bits $K_8^1$ and $K_7^1$ of the first difference Z1 are connected to two inputs of the first NOR gate N11, and to two inputs of the AND gate U13. In a corresponding manner, the bits $K_8^2$ and $K_7^2$ of the second difference Z2 are connected to the inputs of the gates N12 and U12, and the corresponding bits of the third difference Z3 are connected to the inputs of the gates N13 and O11. The first operational sign bit V1 is directly supplied to other inputs of all of the gates. The second operational sign bit V2 is supplied to the other gate inputs of the gates N13 and U11, inverted through a first inverter IN11, and is directly supplied to the remaining gates of the first logic sub-circuit LSI1. The third operational sign bit V3 is supplied to the inputs of the gates N12 and U12, inverted through a second inverter IN12, and is directly supplied to the inputs of the remaining gates. As may easily be derived from the table shown in FIG. 2, it is not necessary to likewise supply the third operational sign bit V3 to the gates N13 and U11, these connections are therefore shown with dashed lines.

The second logic sub-circuit LSI2 is substantially identical to the first sub-circuit LSI1. Instead of the second most significant bit $K_7$, however, the gate circuits N14, N15 and N16, as well as U14, U15 and U16, are supplied with the third most significant bits $K_6^1$, $K_6^2$ and $K_6^3$.

A coding table is shown in FIG. 4 to aid in explaining the operation of the circuit shown in FIG. 3. Discrete or separate combinations of the numerical values $K_8$ throu $K_6$ are shown for positive and negative operational signs. By way of simplification, these numerical values are referenced a, b and c. Assuming that the 8th through 6th most significant bits will be utilized following the operational sign bits, and that the thresholds are fixed at 32, 64 and 96 as explained above, a division or classification into corresponding numerical ranges of the inputs is undertaken by the logic circuit LSI, which thus simultaneously functions as a threshold logic and coding circuit. This takes place by means of a NOR operation (or and OR operation) for positive operational signs "+V" of the maximum difference MD, and by means of an AND operation (or NAND operation) for negative operational signs "−V". Thus, for example, all evaluated bits having a difference less than 32 are assigned a binary value of "zero." If the first threshold of 32 is cross, then the least significant bit $K_6$ of the difference under consideration is assigned a logical "one" but the two more significant bits must still remain "zero." Given negative operational sign −V of the maximum difference MD, logical zeros and logical ones are interchanged in the table of FIG. 4. Accordingly, appropriate gating is undertaken by means of a NAND or an AND operation.

Coding of all potentially required control bits is undertaken simultaneously for all differences. As already indicated in the discussion of the table shown in FIG. 2, selection of the maximum difference MD occurs on the basis of the operational sign bits. Instead of the bits of the maximum difference MD, however, the respective control bits MSB and LSB are now through-connected by the logic circuit LSI.

For the circuit shown in FIG. 3, this means that, given three positive operational signs, such as V1, V2 and V3 all having a logical "zero," the NOR gates N11 and N13 are enabled and will generate a logical "one" as an output, whereas the outputs of all other gates of the first logic stage LSI1 are inhibited and emit a logical "zero." The control bits MSB and LSB pending at the outputs of the OR gates O11 and O12 are thus only defined by the first difference Z1. Depending upon the adjacent combination of operational sign bits, only a single gate of the first logic stage will be enabled in each logic subcircuit. If the differences are all negative, that is, all operational sign bits are at a logical "one" then the AND gates U13 and U16 will be through-connected.

Departing from the numerical range classification described up to this point, other possibilities are possible within the framework of the inventive concept disclosed herein. It is only necessary that a two-stage logic circuit be utilized. To this end, it may be necessary to expand the circuit arrangement shown in FIG. 3. Thus, for example, the NOR gate N11 may be replaced for realization of an OR function by two gates connected in parallel, whose outputs are connected to the inputs of an OR gate O11, which is likewise to be expanded. One of the two new NOR gates is thus supplied with the previous combination of the two most significant bits $K_8^1$ and $K_7^1$, but the second new NOR gate receives the combination of the bits $K_8^1$ and $K_6^1$. Of course, gates with more than five inputs may also be utilized in the first logic stage.

It is also possible without departing from the inventive concept disclosed and claimed herein to utilize subtraction circuits in the subtraction unit SUB instead of adders, when transit times permit the use of such components. Given the use of adders, subtraction is then correctly executed when the two's complement of the number to be subtracted is added. In most cases, however, it is sufficient when all bits of the number to be subtracted are inverted and subsequently added. Given a negative operational sign of the maximum difference MD, this means an error in the final result in the last binary place evaluated. This error generally plays no part given the division of the numerical values of the maximum difference MD into the various classifications. The error may, however, be eliminated by a suitable logic circuit constructed in a more complicated fashion if needed. In the further processing of the control bit, it is also possible to achieve an exact range division upon employment of the operational sign.

Although other modifications and changes may be suggested by those skilled in the art it is the intention of the inventor to embody within the patent warranted hereon all changes and modifications as reasonably and properly come within the scope of his contribution to the art.

I claim as my invention:

1. A circuit for rapidly determining a greatest difference among three binary values and for classifying said greatest difference in one of a plurality of ranges and for encoding a control signal consisting of two control bits identifying the range in which said greatest difference is classified, said circuit comprising:
   a subtraction unit for forming at respective outputs three binarily represented differences from said three binary values, each binarily represented difference having an operational sign bit followed by a plurality of bits of decreasing significance; and
   a logic unit connected to the outputs of said subtraction units, said logic unit having a plurality of operational sign inputs for receiving said respective operational sign bits and having a selected number of data inputs for receiving only a selected number of the most significant bits from each of said binarily represented difference, said logic unit having two logic sub-units for respectively forming said control bits, each logic sub-unit having a plurality of first stage NOR gates and a plurality of first stage AND gates, each of said first stage NOR and AND gates having a plurality of inputs to which said operational sign bits and a number of said most significant bits less than said selected number of most significant bits from each said binarily represented difference are supplied, and each logic sub-unit further having a second stage NOR gate to which the output of each of said first stage NOR gates and AND gates are supplied, said second stage NOR gate having an output at which the control bit for the respective logic sub-unit is present.

2. A circuit as claimed in claim 1 wherein said selected number of most significant bits is three.

3. A circuit as claimed in claim 1 wherein said plurality of ranges are defined by whole multiples of a power of two of the least significant of said selected number of most significant bits.

4. A circuit as claimed in claim 3 wherein said least significant of said selected number of most significant bits is the fifth most significant bit of said binarily represented difference, and wherein said ranges are less than 32, greater than or equal to 32 and less than 64, greater than or equal to 64 and less than 96, and greater than 96.

5. A circuit as claimed in claim 1 wherein said selected number of most significant bits is three, and wherein said plurality of first stage NOR and AND gates in one of said logic sub-units consists of three NOR gates and three AND gates, each having inputs connected to the two most significant data inputs, and wherein said plurality of first stage NOR and AND gates in the other of said logic sub-units consists of three NOR gates and three AND gates, each having inputs connected to the most and least significant data inputs, each of said NOR and AND gates in each of said two logic sub-units also having inputs connected to each of said operational sign inputs.

6. A circuit as claimed in claim 5 further comprising two inverters respectively interconnected between two of said operational sign inputs and one of said NOR gates and one of said AND gates in each of said logic sub-units.

* * * * *